(12) United States Patent
Soto et al.

(10) Patent No.: US 12,468,198 B2
(45) Date of Patent: Nov. 11, 2025

(54) MULTI-COLOR VARIABLE TRANSMISSION OPTICAL DEVICE

(71) Applicant: ALPHAMICRON INCORPORATED, Kent, OH (US)

(72) Inventors: Pedro Soto, Kent, OH (US); Antonio Munoz, Shaker Heights, OH (US); Ludmila Sukhomlinova, Kent, OH (US); Bahman Taheri, Shaker Heights, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 62 days.

(21) Appl. No.: 18/694,575

(22) PCT Filed: Sep. 22, 2022

(86) PCT No.: PCT/US2022/044310
§ 371 (c)(1),
(2) Date: Mar. 22, 2024

(87) PCT Pub. No.: WO2023/049224
PCT Pub. Date: Mar. 30, 2023

(65) Prior Publication Data
US 2024/0402548 A1    Dec. 5, 2024

Related U.S. Application Data

(60) Provisional application No. 63/246,940, filed on Sep. 22, 2021.

(51) Int. Cl.
*G02F 1/1347* (2006.01)
*G02C 7/10* (2006.01)
(Continued)

(52) U.S. Cl.
CPC ......... *G02F 1/13475* (2013.01); *G02C 7/101* (2013.01); *G02F 1/13306* (2013.01); *G02F 1/13725* (2013.01)

(58) Field of Classification Search
CPC .................................................. G02F 1/13475
See application file for complete search history.

(56) References Cited

U.S. PATENT DOCUMENTS

| 5,212,585 A | 5/1993 | Ning |
| 5,943,104 A | 8/1999 | Moddel et al. |

(Continued)

FOREIGN PATENT DOCUMENTS

| WO | 1997015256 A1 | 5/1997 |
| WO | 2022047371 A1 | 3/2022 |
| WO | 2023014756 A1 | 2/2023 |

OTHER PUBLICATIONS

Extended European Search Report from EP Application No. 22873553.6 dated Feb. 6, 2025, 11 pages.

(Continued)

*Primary Examiner* — Edmond C Lau
(74) *Attorney, Agent, or Firm* — Alavi IP (57) ABSTRACT

A multi-color variable transmission optical device ("MC-VTOD") includes a first cell having a first electro-optic material provided between a first pair of substrates and a second cell having a second electro-optic material provided between a second pair of substrates.
The first electro-optic material can changing from a state of higher light transmittance to a state of lower light transmittance in a first wavelength region upon a change in an electric field applied across the first electro-optical material. The second electro-optic material is capable of changing from a state of higher light transmittance to a state of lower light transmittance in a second wavelength region different from the first wavelength region upon a change in an electric (Continued)

field applied across the second electro-optical material. The MC-VTOD is switchable between i) a clear state wherein the first cell and second cell are in the state of higher light transmission, ii) a first tinted state wherein the first cell is in a state of lower light transmittance and the second cell is in a state of higher light transmittance, and iii) a colorimetrically neutral darkened state wherein at least the second cell is in a state of lower light transmittance. At least the first cell is characterized by a narrow band absorption of 175 nm or less in its state of lower light transmittance.

35 Claims, 7 Drawing Sheets

(51) Int. Cl.
*G02F 1/133* (2006.01)
*G02F 1/137* (2006.01)

(56) References Cited

U.S. PATENT DOCUMENTS

| | | | |
|---|---|---|---|
| 6,214,990 B1 | 4/2001 | Tanaka et al. | |
| 6,999,220 B2 | 2/2006 | Kosa et al. | |
| 7,102,602 B2 | 9/2006 | Kim et al. | |
| 7,567,306 B2 | 7/2009 | Park et al. | |
| 7,811,482 B2 | 10/2010 | Miller et al. | |
| 8,016,415 B2 | 9/2011 | Figler et al. | |
| 8,562,130 B2 | 10/2013 | Kosa et al. | |
| 8,736,805 B2 | 5/2014 | Borenstein et al. | |
| 9,034,457 B2 | 5/2015 | Su et al. | |
| 9,102,652 B2 | 8/2015 | Sukhomlinova et al. | |
| 9,116,370 B2 | 8/2015 | Taheri et al. | |
| 9,130,097 B2 | 9/2015 | Taheri et al. | |
| 9,134,551 B2 | 9/2015 | Sukhomlinova et al. | |
| 9,200,203 B2 | 12/2015 | Sukhomlinova et al. | |
| 9,303,209 B2 | 4/2016 | Munoz et al. | |
| 9,304,333 B2 | 4/2016 | Taheri | |
| 9,335,565 B2 | 5/2016 | Miller, IV et al. | |
| 9,513,524 B2 | 12/2016 | Soto et al. | |
| 9,869,887 B2 | 1/2018 | Taheri et al. | |
| 9,918,508 B2 | 3/2018 | Ryan et al. | |
| 10,095,052 B2 | 10/2018 | Bhatta et al. | |
| 10,310,349 B2 | 6/2019 | Taheri et al. | |
| 10,401,690 B2 | 9/2019 | Baker et al. | |
| 10,914,991 B2 | 2/2021 | Miller, IV et al. | |
| 11,086,184 B1 | 8/2021 | Bergh et al. | |
| 11,194,208 B2 | 12/2021 | Soto et al. | |
| 11,435,610 B2 | 9/2022 | Miller, IV et al. | |
| 11,500,255 B2 | 11/2022 | Taheri et al. | |
| 2005/0036077 A1 | 2/2005 | Khan et al. | |
| 2008/0246900 A1 | 10/2008 | Taheri et al. | |
| 2016/0070132 A1* | 3/2016 | Soto | G02F 1/13725 349/193 |
| 2017/0276960 A1* | 9/2017 | Osterman | G02C 7/022 |
| 2018/0164627 A1 | 6/2018 | Oh | |
| 2018/0224689 A1 | 8/2018 | Demiglio et al. | |
| 2019/0107736 A1 | 4/2019 | Gutierrez et al. | |
| 2019/0306386 A1 | 10/2019 | Akkaya et al. | |
| 2022/0100005 A1 | 3/2022 | Balasubramanian et al. | |
| 2023/0175139 A1 | 6/2023 | Fouliard et al. | |
| 2023/0314883 A1 | 10/2023 | Taheri et al. | |
| 2024/0004245 A1 | 1/2024 | Munoz et al. | |
| 2024/0077777 A1 | 3/2024 | Taheri et al. | |

OTHER PUBLICATIONS

Uchida et al., "Bright dichroic guest-host LCDs without a polarizer", Proceedings of the Society of Information Display, vol. 22, No. 1, Jan. 1981, pp. 41-46.

Wang et al., "All-optical polarization-independent diffraction in dye-doped cholesteric liquid crystal", Journal of Materials Science, vol. 17, No. 5, May 2006, pp. 385-391.

International Search Report and Written Opinion received for International Application No. PCT/US22/44310, mailed on Jan. 3, 2023, 12 Pages.

Specification MIL-PRF-32432A, Performance Specification Military Combat Eye Protection (MCEP) System, published on Sep. 11, 2018, 63 Pages.

Soto, P. Thesis "Modeling and Characterization of Dye-Doped Guest-Host Liquid Crystal Eyewear", Nov. 2015, 149 Pages.

* cited by examiner

MULTI-COLOR VARIABLE TRANSMISSION OPTICAL DEVICE

CROSS-REFERENCE TO RELATED APPLICATIONS

This application is a § 371 application of International Patent Application Number PCT/US2022/044310 filed Sep. 22, 2022, entitled MULTI-COLOR VARIABLE TRANSMISSION OPTICAL DEVICE which claims priority to, and any other benefit of, U.S. Provisional Patent Application Ser. No. 63/246,940, entitled MULTI-COLOR VARIABLE TRANSMISSION OPTICAL DEVICE, filed Sep. 22, 2021, the entire disclosure of which is fully incorporated herein by reference.

TECHNICAL FIELD

The present disclosure relates to optical devices, particularly variable transmissive optical devices that may be reversibly switched between clear and tinted states.

BACKGROUND

Variable transmission optical devices (glasses, goggles, visors, windows, sensors, cameras etc.) that can quickly change between a high-transmission "clear" state and a low-transmission "dark" state have many advantages over fixed transmission devices and are highly desirable. An especially useful feature is the ability to make this quick change occur on demand, whether manually, at the touch of a button by the user, or automatically, under the control of a light sensor and an electronic circuit.

Generally, it is desirable for such variable transmittance optical devices to have good optical properties while using clear substrates, to exhibit a wide transmission swing (a wide difference between the clear and the tinted states).

Recently, liquid crystals have been used to provide switchable optical devices that allow variable light transmittance. Liquid crystal systems can be broadly categorized as polarizer-based (which contain, at least, one polarizer) or guest-host systems that do not utilize a polarizer. The polarizer-based systems are used in applications where the dark state transmission is the most important parameter. They are used when it is necessary to obtain minimal transmission conditions. Such applications include flat panel displays as well as welding helmets and 3D glasses. However, polarizers limit the amount of light transmission of the device, often well below a theoretical limit of only 5000 transmission.

Another type of liquid crystal (LC) arrangement uses a guest-host system. Guest-host systems were traditionally used for display applications where the wide viewing angle and/or true color saturation were important. Examples include cockpit displays that allow the pilot and co-pilot to observe the same image. More recently, switchable guest-host 5 based LC devices are being used in eyewear and other applications to provide light attenuation. However, various challenges still exist.

For example, one difficulty in defining any parameters for eyewear applications has been the inherent conflict between the properties of various components used in an electro-optic system. This can lead to a perceived physical limitation on the performance, such as the transmission swing, i.e., the difference between the clear state transmission and the tinted/dark state transmission. A large transmission swing can be achieved by using a guest-host liquid crystal/dye system that utilizes specific host liquid crystals together with high performing dichroic dyes (guests). However, such dyes generally have intrinsically lower solubility or miscibility in the liquid crystal (host) and can disrupt the liquid crystalline phase and alter the nematic to isotropic phase transition temperature (TN]) Furthermore, such dyes dictate a higher degree of polarization dependence in the performance. "Polarization dependence" is a measure of a material's response to two orthogonal polarizations, i.e., where the optical properties of a material experienced by an incident light (such as index of refraction or absorption/transmittance) are dependent 20 on the polarization of the incident light. An increase in polarization dependence can, in turn reduce the swing in the transmission between the clear and tinted states.

Furthermore, this property may also become undesirable because a higher polarization dependence can reveal even small structural imperfections within the liquid crystal cell configuration and/or any plastic substrates used in the device. Since the eye and high sensitivity sensors can easily pick out even minor variations in the field of vision, traditional systems using high performing dyes had poor optical performance. In addition, in certain situations, it is desirable to have a switchable optical device that can have the capability of changing between multiple hue/tinted states.

Lenses having different static colors are known and have a variety of applications. For example, copper, orange, and yellow/amber lens tints are generally promoted as helpful in certain conditions because these colors can make an environment appear brighter by enhancing contrast and depth perception. They accomplish this by selectively reducing transmission of "blue" light (of a shorter wavelength) that scatters more readily and can lead to reduction in the ability of a viewer to focus. In other words, depending on lighting conditions, removing certain wavelengths for impinging on the eye/sensor 5 can improve sharpness and depth perception while also reducing eye fatigue. However, while having a high contrast lens hue has many advantages in particular lighting situations, they may become disadvantageous in other situations. Situations and conditions may change quickly, and so it is desirable to be able to quickly readjust the color of the optical device or lens.

In other, more strictly controlled, applications such as for military personnel there are strict color, chromaticity and optics requirements that have hampered prior attempts at multi-colored optical devices. For example, it has been difficult to achieve the strict requirements for luminous transmission, neutrality, chromaticity, polarization independence and optical clarity in one switchable multicolored device. Even in these systems, there are situations that will require a tinted system that selectively filters a portion of the spectrum more than other regions. For example, the military, police, first responders, pilots and others can face threats from laser light wielded by hostile persons or devices. Defending against laser light has been difficult and solutions to date have been largely unsatisfactory. For example, a common approach (for green lasers) has been simply to provide a green-light absorbing strip at a top portion of a face shield. This only provides protection against green lasers and only if the person wearing it has their head properly angled. Furthermore, the system will continue to block that region of the spectrum regardless of the presence or absence of the threat. This can lead to color distortions which do not meet the optical requirements for general use.

Thus, there is a need to provide a single variable transmission optical system (e.g., lenses, goggles, visors, face shields, windows, windshields, AR or VR glasses, or the like) that can achieve multiple different tints, thereby increasing the functionally and adaptability of the optical device to various conditions in the field.

The systems and methods of the present disclosure overcome these and other shortcomings known in the art by stacking two films of electro-optic material each with a particular (differing) color pallet, achieving a "3-tint" or "4-tint" state solution. Other parameters can also be utilized, as described further below.

SUMMARY

In accordance with some embodiments of this disclosure, a multi-color variable transmission optical device ("MC-VTOD") includes a first cell having a first electrooptic material provided between a first pair of substrates. The first electro-optic material is capable of changing from a state of higher light transmittance to a state of lower light transmittance in a first wavelength region upon a change in a first electric field applied across the first electro-optical material. The MC-VTOD also includes a second cell in optical communication with the first cell, the second cell including a second electro-optic material provided between a second pair of substrates. The second electro-optic material is capable of changing from a state of higher light transmittance to a state of lower light transmittance in a second wavelength region different from the first wavelength region upon a change in a second electric field applied across the second electro-optical material. The MC-VTOD includes a controller having a power supply for independently controlling the electric field applied to the first cell and the second cell.

The MC-VTOD is switchable between i) a clear state wherein the first cell and second cell are each in the state of higher light transmission, ii) a first tinted state wherein one cell is in a state of lower light transmittance and the second cell is in a state of higher light transmittance, and iii) a more colorimetrically neutral darkened state wherein at least the second cell or both cells are in a state of lower light transmittance. At least the first cell is characterized by a narrow band absorption of 175 nm or less in its state of lower light transmittance.

In accordance with some other embodiments of this disclosure, the MC-VTOD is switchable between i) a clear state wherein the first cell and second cell are each in the state of higher light transmission, ii) a first tinted state wherein the first cell is in a state of lower light transmittance and the second cell is in a state of higher light transmittance, iii) a second tinted state wherein the first cell is in a state of higher light transmittance and the second cell is in a state of lower transmittance, and iv) a third tinted state wherein 30 both the first and second cells are in a state of lower transmittance. At least one of the first, second, and third tinted states is a colorimetrically neutral darkened state.

DETAILED DESCRIPTION

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems techniques, and applications. It is to be understood that the drawings are for purposes of illustrating the concepts of the disclosure and may not be to scale.

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4.

As used in the specification and in the claims, the terms "comprise(s),", "include(s)," "having," "has" "can," "contain(s)," and variants thereof, as used herein, are intended to be open-ended transitional phrases, terms, or words that require the presence of the named ingredients, components, or steps, and that permit the presence of other ingredients, components, or steps.

The present disclosure may include one or more of the following terms whose meanings may be as described below.

"Absorption" as used herein may define the percentage of light absorbed by the mixture, cell or optical device.

"Absorption band" may define the spectral wavelength wherein absorption occurs.

"Clear state" or "clear state transmission", as used herein, may refer to the state where the guest-host mixture exhibits maximal light transmittance.

"Dark state" or "dark state transmission" may refer to the state where the guest-host mixture exhibits minimal light transmittance.

A "Dichroic (DC) Dye" is dye molecule that has a rodlike shape and displays a unique anisotropy in which its light absorption properties occur parallel ((111) and perpendicular (UI) to the molecule, this being characterized by the dichroic ratio, DR=(III/UI. Any molecule that has a dichroic ratio (DR) is one that exhibits "dichroism".

"Dichroic ratio", "average dichroic ratio" or of the mixture (DR=(III/(11 refers to the dichroic ratio of the guest-host mixture which may contain one or more DC dyes. The mixture dichroic ratio may be measured using the formula for Effective Dichroic Ratio (Def) or Aggregate Effective Dichroic Ratio (Deff-agg). Thus, as used herein, Dnix, Door Deff-agg are used interchangeably (depending on which method is used to measure the dichroic ratio) and describe the same parameter.

"Narrow Band Absorption" as used herein, is defined as a spectral absorption band width with a Full Width at Half Max (FWHM) that is less than or equal to 175 nm, 25 or alternatively less than or equal to 165 nm, 155 nm, 120 nm, or 80 nm, where the entire spectral absorption band is measured within the visible region of 400-700 nm.

"Narrow Band Mixture" refers to a guest-host liquid crystal mixture that can be used in a narrow band cell.

Nematic-isotropic transition temperature or TNI is the temperature at which the liquid crystal undergoes the nematic to isotropic transition, which is the transition from the orientationally ordered nematic phase to the totally disordered isotropic phase.

As used herein, TM refers to the nematic-isotropic transition temperature of the guest-host mixture.

"Order parameter of the guest-host mixture" or "Smix" refers to the order parameter of the guest-host mixture. The mixture may contain one or more dyes as well as other dopants. The Smx can be measured according to the method described herein, e.g., using the formula for Effective Order Parameter (Seff) or Aggregate Effective Order Parameter (Seff-agg). As used herein Smix, SO and Self-agg are used interchangeably (depending on which method is used to measure the order parameter) and describe the same parameter.

"Polarization dependence" is a measure of a material's response to two orthogonal linear polarizations, i.e., where the optical properties of a material experienced by an incident light (such as index of refraction or absorption/transmittance) are dependent on the polarization of the incident light.

"Polarization sensitivity" is the relative measure of the response of the material between the two orthogonal linear polarizations. In ideal, theoretical limit, zero percent (0%) polarization sensitivity refers to a completely polarization insensitive device and a 100° 0 polarization sensitivity refers to a completely polarization sensitive device as obtained using a polarizer.

"Polarizer" refers to a material, layer, or component that absorbs or reflects one polarization of incident light more than the orthogonal polarization.

Transmission" and "Transmittance" are used interchangeably and mean the percentage of light that is transmitted through a mixture or device.

"Transmission swing" refers to the difference in transmission between the clear state and dark state transmissions. For example, if the clear state transmission is 65° 0 and the dark state transmission is 15° 0, the transmission swing is 65-15-4000. The transmission swing of an optical device can be measured using equipment such as a "haze-gard plus" device from BYK-Gardner, USA, or equivalent.

"Tint" or "tinted" state refers to a condition where, relative to a clear state, the guest-host mixture exhibits some light absorption which may be narrow band absorption 30 (<175 nm bandwidth) or wide-band absorption (>175 nm). A tinted state may correspond to a color state, or alternatively, may correspond to a low color chromaticity state.

"Uniform optical retardation" refers to plastic substrates having an optical retardation variation that is less than +20%. "Optical retardation" is defined as the change in the optical phase experienced by different polarizations of incident light.

"Visible light" refers to a wavelength range of about 400 to about 700 nm.

"Wide band absorption" as used herein, may refer to a spectral absorption band that is greater than 175 nm, and preferably greater than 180 nm, 185 nm, 190 nm, 195 nm or 200 nm, where the entire spectral absorption band is contained within the range of visible wavelengths, typically assumed to be 400 nm-700 nm Wide band absorption may in some cases have a low color chromaticity, but in other cases, may have a color.

"Wide Band Cell" refers to a device capable of producing a wide absorption band, and a wide (i.e. >30%) transmission swing with polarization sensitivity of less than 50%, or in some examples less than 40%, 30%, 20%, 15%, or in some examples less than 10%.

"Wide Band Mixture" refers to a guest-host liquid crystal mixture that can be used in a wide band cell.

Note that the terms "transmittance" and "transmission" may generally be used interchangeably herein.

Optical Device Overview

Figure 1:
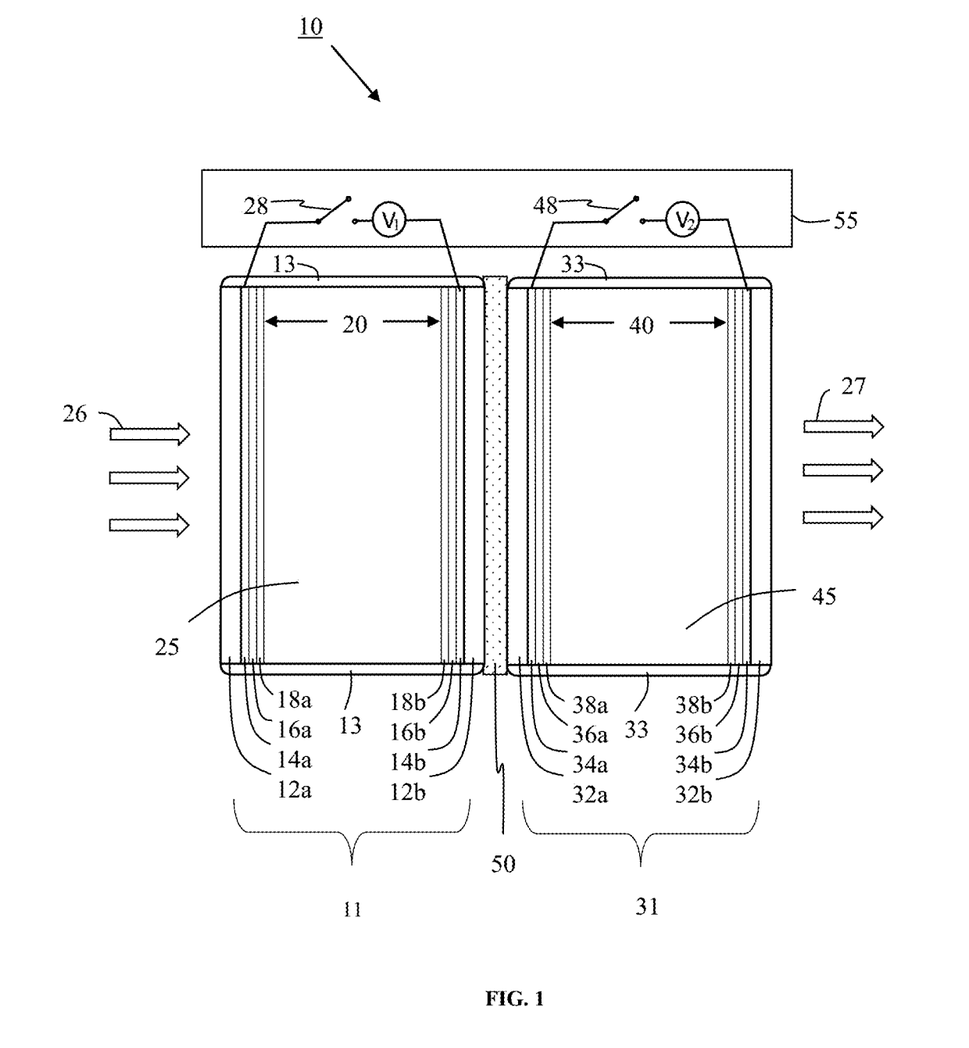
FIG. 1 is a cross-sectional view of a non-limiting example of a Multi-Color Variable Transmission Optical Device ("MC-VTOD") according to some embodiments.

FIG. 1 is a cross-sectional view of a non-limiting example of a Multi-Color Variable Transmission Optical Device ("MC-VTOD") according to some embodiments. In some embodiments, MC-VTOD 10 may include a first cell 11 in optical communication with a second cell 31 such that incident light 26 may optionally be modulated by the first cell, by the second cell, or by both the first and second cells, and pass through the device as transmitted light 27. The first and second cells may optionally be separated by layer 50, which may include, for example, an optically transparent adhesive, a polymer film, a glass layer, or an optical article such as a lens, a window, a visor or the like. In some embodiments, layer 50 may be selected to reduce insertion loss associated with interfaces.

Each cell may include a pair of substrates, 12a, 12b for the first cell, and 32a, 32b for the second cell. As discussed in more detail later, the substrates may be independently selected and include, for example, a polymeric material, a glass, or a ceramic. Each cell may include a pair of transparent conducting layers, 14a 14b for the first cell, and 34a,34b for the second cell, which may be provided or coated over each respective substrate surface interior to the cell. In some embodiments, an optional passivation layer (which in some cases may be referred to as an insulating layer or "hard coat"), 16a, 16b, 36a, 36b, may be provided over the respective transparent conducting layer. The passivation layer may include, for example, a non-conductive oxide, sol-gel, polymer, or a composite. An optional alignment layer 18a, 18b, 38a, 38b, may be provided over the passivation layer or the transparent conducting layer. As a non-limiting example, the alignment layer may include polyimide. In some embodiments, the alignment layer may function as a passivation layer. In some embodiments, the alignment layer may be brushed as is known in the art to assist in orienting the electro-optic material, e.g., a LC host, near the surface.

In some embodiments, both alignment layers of a cell are brushed. In some embodiments, a cell may include only one brushed alignment layer.

The first cell 11 includes a first electro-optic material 25, e.g., a first liquid crystal guest-host mixture, provided between the first cell's pair substrates 12a, 12b. The first electro-optic material is capable of changing from a state of higher light transmittance to a state of lower light transmittance in a first wavelength region upon a change in a first electric field applied across the first electro-optical material. The first electric field may be changed, for example, by changing the voltage applied between the first cell's pair of transparent conductive layers 14a 14b. The substrates and any overlying layers define a first cell gap 20. Similarly, second cell 31 includes a second electro-optic material 45. e.g., a second liquid crystal guest-host mixture different from the first liquid crystal guest-host mixture, provided between the second cell's pair of substrates 32a, 32b. The second electro-optic material is capable of changing from a state of higher light transmittance to a state of lower light transmittance in a second wavelength region different from the first wavelength region upon a change in a second electric field applied across the second electro-optical material. In some embodiments, the first wavelength region may be separate from the second wavelength region, but in other cases, the two regions may partially overlap. The second electro-optic material in its state of lower light transmittance has a different absorbance spectrum than the absorbance spectrum of the first electro-optic material in its state of lower light transmittance. This difference can be used to create different tinted states depending upon which cells are appropriately activated. The second electric field may be changed, for example, by changing the voltage applied between the second cell's pair of transparent conductive layers 34a, 34b.

These substrates and any overlying layers define a second cell gap 40. Second cell gap 40 may be the same or different than cell gap 20. To aid in maintaining the separation, optional spacers (not shown), such as glass or plastic rods or beads, may be inserted between the respective substrates for each cell.

In some cases, the first and second cell structures may be enclosed by sealing material 13, 33 such as a UV-cured optical adhesive or other sealants known in the art.

Sealing material 13 and 33 may be the same or different. FIG. 1 shows the sealing materials of the first and second cells as separate, but in some embodiments, a single common sealing material layer may instead seal both cells. It is to be appreciated that the sealing material 13, 33, may be provided anywhere to create a seal for electro optic material 25, 45, between the substrates 12a, 12b, 32a, 32b. For example and without limitation, sealing material may be placed between the substrates 12a 12b, 32a, 32b and any overlying layers. In some embodiments, the sealing material may include spacers for maintaining cell gap 20, 40.

The conducting layers of each cell 14a 14b, 34a 34b, may be electrically connected to a controller 55. Controller 55 may include one or more variable voltage supplies which are represented schematically by the encircled VI and V2, for the first cell and second cell, respectively. FIG. 1 shows a first cell power circuit with its switch 28 open so that no voltage is applied When switch 28 is closed, a variable voltage or electric field may be applied across liquid crystal guest-host mixture 25. Similarly, a second cell power circuit is shown with its switch 48 in an open position so that no 25 voltage is applied. When switch 48 is closed, a variable voltage or electric field may be applied across liquid crystal guest-host mixture 45.

In some embodiments (not shown), rather than including layer 50, the second and first cells may share a substrate, e.g., substrate 12b, such that the transparent conducting layer 34a (and optionally other layers 36a and/or 38a), are provided on the substrate surface opposite to that having transparent conducting layer 14b of the first cell. Such a structure in some cases may reduce possible optical losses. Note that any or all of substrates 12a, 12b, 32a 32b may be the same or different, any or all transparent conducting layers 14a, 14b, 34a, 34b may be the same or different, any or all of optional passivation layers 16a, 16b, 36a, 36b may be the same or different, and any or all of optional alignment layers 18a, 18b, 38a, 38b may be the same or different. In some 5 embodiments, one or both cells include only one alignment layer.

Electro-Optic Material

An electro-optic material is one capable of changing its light absorption profile upon application of an electric field. In some embodiments, the electro-optic material includes a guest-host system having an LC host and a DC dye dissolved or dispersed therein.

A guest-host effect is an electro-optical effect that involves a mixture of dichroic dye "guest" and liquid crystal "host" wherein the dichroism is adjusted within a voltage-controllable liquid crystal cell. In an isotropic host, the molecules are randomly oriented, and the effective absorption is a weighted average: Ueff=(·α⊥+α∥)/3. In an anisotropic LC host material, designed for polarization independent operation, the absorption can be increased to Ueff= ((11+(111)/2 or decreased to UI, depending on the desired effect.

In some embodiments, a liquid crystal guest-host includes a mixture of a cholesteric liquid crystal host and a dyestuff material. The dyestuff material may be characterized as having dichroic properties, and as described below, may include a single 20 dye or a mixture of dyes to provide these properties. In some embodiments, the liquid crystal guest-host mixture may be formulated as a "narrow band mixture". In some embodiments, at least one cell 11, 31 includes a narrow band mixture as electro-optic material 25, 45. In some embodiments, both cells include narrow band mixtures that are different from each other. In some embodiments, one cell includes a narrow band 25 mixture, and the other cell includes a wide band mixture. In some embodiments, both cells include a wideband mixtures that are different from each other.

LC Host

In some embodiments, the host includes a chiral nematic or cholesteric liquid crystal material (collectively "CLC") which may have a negative dielectric anisotropy ("negative CLC") or a positive dielectric anisotropy ("positive CLC"). In some embodiments of the CLC, the liquid crystal material is cholesteric, or it includes a nematic liquid crystal in combination with a chiral dopant. A CLC material has a twisted or helical structure. The periodicity of the twist is referred to as its "pitch". The orientation or order of the liquid crystal host may be changed upon application of an electric field, and in combination with the dyestuff material, may be used to control or partially control the optical properties of the cell 11, 31. In some embodiments, the CLC may be further characterized by its chirality, i.e., right-handed chirality or left-handed chirality.

A wide variety of CLC materials are available and have potential utility in various embodiments of the present disclosure.

Dyestuff Material

To provide dichroic properties, the dyestuff material generally includes at least one dichroic (DC) dye or mixture of DC dyes. In some cases, the dyestuff material may optionally further include a photochromic (PC) dye or a photochromic-dichroic (PCDC) dye whose light absorbance may be activated by exposure to UV light such as sunlight.

In some embodiments, the dyestuff material may further include a small amount of a conventional absorbing dye, e.g., to provide the device with a desired overall hue in the clear state. In some embodiments, the dyestuff material includes substantially only DC dyes. The dyestuff material for at least one cell, alternatively both cells, may provide a narrow band absorption that is less than or equal to 175 nm, or alternatively less than or equal to 165 nm 155 nm 120 nm 100 nm, or 80 nm.

DC Dyes

Dichroic dyes typically have an elongated molecular shape and exhibit anisotropic absorption. Commonly, the absorption is higher along the long axis of the molecule and such dyes may be referred to as "positive dyes" or dyes exhibiting positive dichroism. Positive DC dyes are generally used herein. However, in some cases, negative DC dyes that exhibit negative dichroism may be used instead. In some embodiments, a DC dye (as measured in a CLC host) may have a dichroic ratio of at least 5.0, alternatively at least 6, 7, 8, 9, 10, 1 1, 12, 13, 14, 15, 16, 17, 18, 19 or 20.

The level of visible light absorption by the DC dye may be a function of the dye type and the CLC host. In the MC-VTOD of the present disclosure, the apparent absorption of visible light may also be a function of voltage. The orientation or long-range order of the CLC may be a function of electric field or voltage across the cell thickness. A DC dye exhibits some alignment with the CLC host so that application of a voltage may be used to alter the apparent darkness of the cell.

In some embodiments, a DC dye may include a small molecule type of material. In some embodiments, a DC dye may include an oligomeric or polymeric material. The chemical moiety responsible for light absorption may, for example, be a pendent group on a main chain. Multiple DC dyes may optionally be used, for example, to tune the light absorption envelope or to improve overall cell performance with respect to lifetime or some other property. DC dyes may include functional groups that may improve solubility, miscibility with or bonding to the CLC host. Some non-limiting examples of DC dyes may include azo dyes, for example, azo dyes having 2 to 10 azo groups, or alternatively, 2 to 6 azo groups. Other DC dyes are known in the art, such as anthraquinone and perylene dyes. Generally, any molecule with dichroic properties can be used.

Other Cell Features
Substrate

Referring again to FIG. 1, in some embodiments, the substrate 12a 12b, 32a, 32b may be independently selected and may include a plastic, a glass, a ceramic, or some other material. Choice of material and its particular properties depends in part on the intended application. For many applications, the substrate should be at least partially transmissive to visible light. In some embodiments, a substrate may have higher than 45° 0 transmission to visible radiation having a wavelength between 400 nm and 700 nm alternatively, higher than 50% 60% 70% 80% 90° 0, or 95° 0 transmission. In some embodiments, the substrate may have high optical clarity so that a person or sensor May clearly see through the MC-VTOD 10. In some embodiments, the substrate may optionally have some color or tint. In some embodiments, the substrate may have an optical coating on the outside of the cell. A substrate may be flexible or rigid.

As some non-limiting examples, a plastic substrate may include a polycarbonate (PC), a polycarbonate and copolymer blend, a polyethersulfone (PES), a polyethylene 30 terephthalate (PET), cellulose triacetate (TAC), a polyamide, p-nitrophenyl butyrate (PNB), a polyetheretherketone (PEEK), a polyethylene naphthalate (PEN), a polyetherimide (PEI), polyarylate (PAR), a polyvinyl acetate, a cyclic olefin polymer (COP) or other similar plastics known in the art. In some non-limiting examples, flexible glass including materials such as Corning® Willow® Glass and the like can be used as a substrate. A substrate may include a multiple materials or have a multi-layer structure.

In some embodiments, the thickness of a substrate may be in a range of 10-20 gm, 20-30 pun, 30-40 gm, 40-50 gm, 50-75 gm, 75-100 gm, –150 gm, 150-200 200-250 250-300 300-350 350-400 400-450 m 450-500 um, 500-600 um, 600-800 um, 800-1000 µm, or greater than I mm or any combination of ranges thereof.

As a general feature, in some embodiments, the MC-VTOD 10 does not use polarizers.

Transparent Conducting Layer

By "transparent" conducting layer, it is meant that the conducting layer 14a, 14b, 34a, 34b allows at least 45% of incident visible light to pass through. A transparent conducting layer may absorb or reflect a portion of visible light and still be useful. In some embodiments, the transparent conducting layer may include a transparent conducting oxide (TCO) including, but not limited to, ITO or AZO. In some embodiments, the transparent conducting layer may include a conductive polymer including, but not limited to PEDOT: PSS, a poly(pyrrole), a polyaniline, a polyphenylene, or a poly(acetylene). In some embodiments, the transparent conducting layer may include a partially transparent thin layer of metal or metal nanowires, e.g., formed of silver, copper, aluminum, or gold. In some embodiments, the transparent conducting layer may include graphene.

Chromaticity

In accordance with the present disclosure, an MC-VTOD 10 may optionally be configured to have a colorimetrically neutral chromaticity in its "clear state", i.e., where both the first cell 11 and the second cell 31 are each in a state of higher light transmission that is at or near their maximum light transmission. In some embodiments, an MC-VTOD 10 may be configured to provide a colorimetrically neutral chromaticity in its tinted or "darkened" state where at least the second cell, but optionally both the first cell and second cells, are in a state of lower light transmission, optionally at or near their minimum light transmission.

Figure 2:
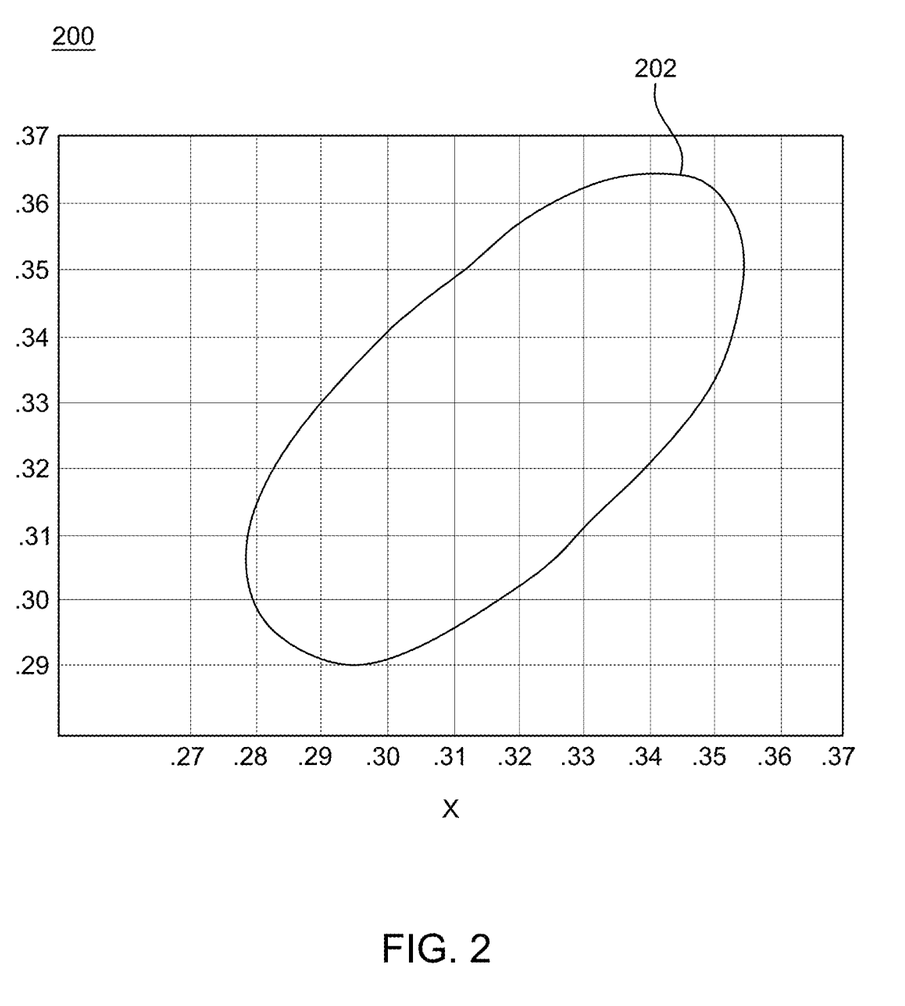
FIG. 2 is a portion of the CIE 193 1 x-y color space chromaticity diagram.

Chromaticity is an objective specification of the quality of a color regardless of its luminance. Chromaticity generally consists of two independent parameters, often specified as hue (h) and colorfulness(s), where the former is related to the perceived color and the latter is alternatively called saturation, chroma, intensity. Chromaticity coordinates are calculated from spectrophotometric data and can be expressed by the well-known CIE 193 1 X-Y color space chromaticity diagram. FIG. 2 shows a portion of the chromaticity diagram 200 in the generally neutral region. A white point for the color space of chromaticity diagram 200 is X=Y=0.333, which is equivalent to "black" at zero luminance, or white at high luminance. In some embodiments, a low color chromaticity state may be one where the color coordinates x and y fall within the region 202 of FIG. 2.

In some embodiments, a low color chromaticity state may be one where the x-coordinate is in a range of about 0.27 to about 0.36 and the y-coordinate is in a range of about 0.29 to about 0.37. In some embodiments, a tinted state may be characterized as a low color chromaticity state. In other cases, a tinted state may be characterized as a color state when its chromaticity falls outside of region 202 or outside the aforementioned x-y ranges.

A low color chromaticity system in its darkened state may generally appear grey, black or "smoked" color. However the hue of the system can also be defined in terms of "Chromaticity and Neutrality" These methods of definitions are used in certain military and automotive specifications, including by not limited to MIL-DTL-4351 ID and MIL-PRF-32432A, each incorporated by reference herein in its entirety. In some embodiments, a neutral state (one having neutrality) has an average percent deviation of spectral transmittance in a range of 400 nm to 700 nm that is less than about 30%-alternatively less than about 20% 15° 0, or 12° 0. In some cases, an average percent deviation of spectral transmittance may be one as defined in MIL-PRF-32432A (published Sep. 11, 2018), e.g., as calculated according to its Table VIII. A colorimetrically neutral state may be characterized as having both neutrality and low color chromaticity.

MC-VTOD Embodiments and Properties

FIGS. 3A-3D are a series of cross-sectional schematics of a non-limiting example of an MC-VTOD according to some embodiments. MC-VTOD 310 includes a first cell 311 having a first guest-host mixture including a negative first CLC host 322 and a first dyestuff material that includes at least one positive first DC dye 324. The host and dye molecules are drawn to illustrate a general orientation. The first cell is in optical communication with a second cell having a second guest-host mixture including a negative second CLC host 342 and a second dyestuff material that includes at least one positive second DC dye 344 that is different than the first DC dye 324. For clarity, other components of the cells 311, 331 are not shown, but may optionally be as described with respect to FIG. 1 and variations thereof. Each cell can be independently controlled by power circuits VI and V2 provided in controller 355.

Figure 3A:
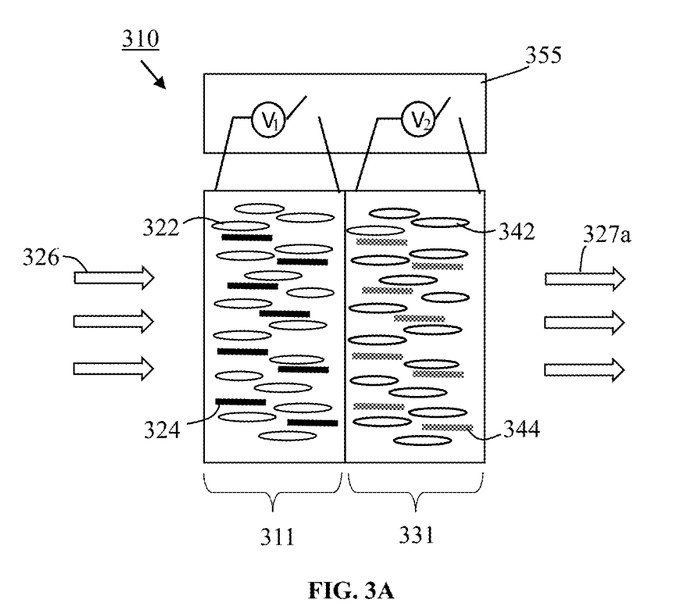
FIGS. 3A-3D are series of cross-sectional schematics of a non-limiting example of an MC-VTOD according to some embodiments.

In FIG. 3A, both power circuits VI and V2 are open with no voltage applied across either cell 311 331. The first and second cells are both in a state of higher light transmission (which may be at or near their maximum light transmission state) and the MC-VTOD 310 is in a clear state which may be at or near its most light transmissive state where a substantial amount of incident visible light 326 passes through as transmitted light 327a. In some embodiments, the transmitted light 327a is colorimetrically neutral.

Figure 3B:
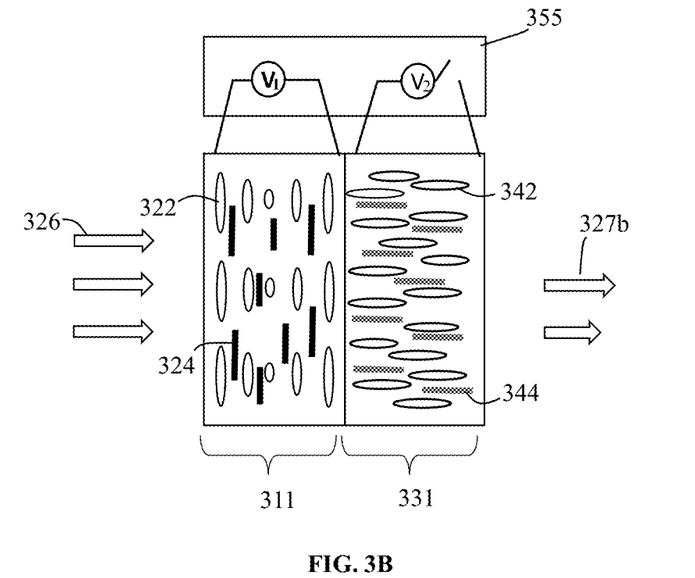

In FIG. 3B the second cell's power circuit V2 remains open with no voltage applied, but the first cell's power circuit VI is closed, and a voltage is applied above a threshold voltage sufficient to significantly reorient the CLC host 322 and DC dye 324. Light absorption in a first wavelength region increases as the voltage is increased. Light transmission can be varied based on applied voltage up to a point, beyond which, increasing the voltage has less effect. In FIG. 3B, the MC-VTOD is in a first tinted state where the first cell 311 is in a state of lower light transmittance (optionally at or near its minimal light transmission state) in a first wavelength region such that some amount of incident visible light 326 in the first wavelength region is absorbed resulting in transmitted light 327b having a first color or tint.

Figure 3C:
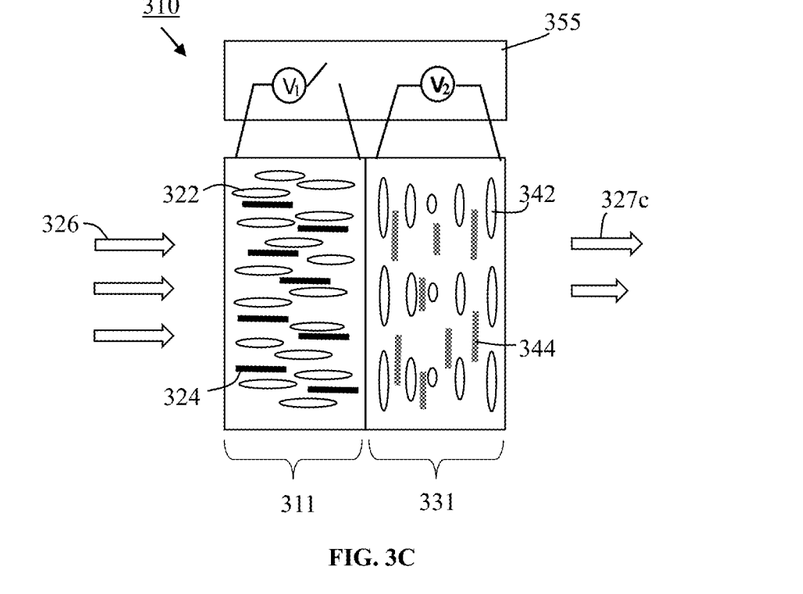

In FIG. 3C, the first cell's power circuit VI is open with no voltage applied, but the second cell's power circuit V2 is closed, and a voltage is applied above a threshold voltage sufficient to significantly reorient the CLC host 342 and DC dye 344. Light absorption in a second wavelength region increases as the voltage is increased. Light transmission can be varied based on applied voltage up to a point, beyond which, increasing the voltage has less effect. In FIG. 3C, the MC-VTOD is in a second tinted state where the second cell is in a state of lower light transmittance (optionally at or near its minimal light transmission state) in a second wavelength region such that some amount of incident visible light 326 in the second wavelength region is absorbed resulting in transmitted light 327c having a second color or tint. In some embodiments, the first tinted state may represent a first color state and the second tinted state may represent a second color state. In some cases, the second color may be complementary to the first color.

Figure 3D:
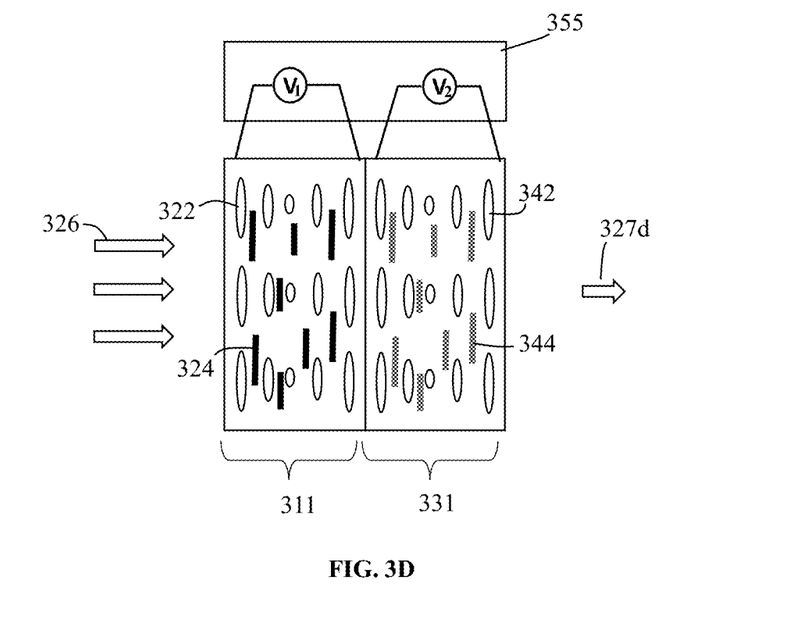

In FIG. 3D, both the first and second cell's power circuits VI and V2 are closed as described in FIGS. 3B and 3C, respectively. In FIG. 3D, the MC-VTOD 310 is in a colorimetrically neutral darkened state, which may optionally be at or near its minimal light transmissive state, such that much of the incident visible light 326 is absorbed resulting in relatively low amount of transmitted light 327d that is colorimetrically neutral. In some embodiments, both the first cell and the second cell may each be at or near its respective minimum light transmission state when the MC-VT OD is in a colorimetrically neutral darkened state. In such case the MC-VTOD may be at its minimum light transmissive state. Alternatively, in some embodiments, at least one of the cells is at or near its minimum light transmissive state and the other cell has substantially lowered light transmission (to produce the colorimetrically neutral darkened state of the MC-VTOD) but the other cell is not necessarily at or near its minimum light transmissive state. That is, the other cell may have additional light absorption capacity that is not used when the MC-VTOD reaches its "darkest" colorimetrically neutral darkened state. Increasing the voltage of the other cell beyond this point may reduce the overall light transmission of the MC-VTOD, but only in the other cell's wavelength range such that the minimum overall light transmission state of the MC-VTOD may have a hue, which may still be acceptable in some situations. That is, in such a case, the MC-VTOD may be characterized as having low color chromaticity but not neutrality.

The transition from one state to another may be abrupt (by switching from one state to another with no intervening states) or graduated (e.g., by gradually increasing or decreasing the light transmission of one or both cells, resulting in one or more intermediate states). Therefore, in some embodiments, the level of light transmission and color hue is variable depending on the voltage applied.

In some embodiments, the light absorbing features of the cells are selected so that the device is capable of achieving a colorimetrically neutral darkened state. If using just two cells e.g., 311, 331, each cell may produce a color that is complementary to the other. For example, one cell may appear blue in its minimum light transmissive state, i.e., it has substantial transmission or a transmission peak in the blue wavelength range, e.g., in a range of about 430 nm to about 490 nm, relative to other visible light wavelengths.

The other cell may appear yellow or orange in its minimum light transmissive state, i.e., it has substantial transmission or a transmission peak in the yellow or orange wavelength range, e.g., in a range of about 570 nm to about 630 nm, relative other visible light wavelengths. Appropriate mixing of the colors from the two cells can produce a colorimetrically neutral darkened state.

Other sets of complementary colors may be used. One cell may appear green in its minimum light transmissive state, i.e., having substantial or a peak light transmission in a green wavelength range of about 500 nm to about 565 nm relative to other colors and another cell may appear magenta or purple having substantial or a peak light transmission in both the blue wavelength range (e.g., 430 nm to about 490 nm) and in the red wavelength range (e.g., about 600 nm to about 700 nm) relative to the green wavelength range. Similarly, one cell may appear red in its minimum light transmissive state, i.e., having substantial or peak light transmission in a range of about 600 nm to about 700 nm relative to other colors, and another cell may appear cyan having substantial light transmission in both the blue and green wavelength ranges and may optionally have a peak transmission in a range of about 490 nm to about 510 nm.

In some embodiments, rather than two cells, three cells may be used, e.g., one that transmits red light, one that transmits green light, and one that transmits blue light. In combination, a colorimetrically neutral darkened state can be generated. Such a device could further extend the color palette options when using MC-VTOD thereby increasing its overall versatility.

In some embodiments, one cell, e.g., the first cell 311 of the MC-VTOD 310, May 5 include narrow band mixture (a narrow band cell) and the other cell, e.g., the second cell 331, may include a wide band mixture (a wide band cell). In such cases, a first tinted state may be achieved by changing the narrow band cell from a state of higher transmittance to a state of lower transmittance. A colorimetrically neutral darkened state may be achieved by changing the wide band cell from a state of higher transmittance to a state of lower transmittance, optionally with the narrow band cell in a state of higher transmittance. A system like this may be useful for defending against lasers where the narrow band cell may be designed to absorb light from one or more lasers but where general darkening is controlled by the wideband cell.

Figure 4:
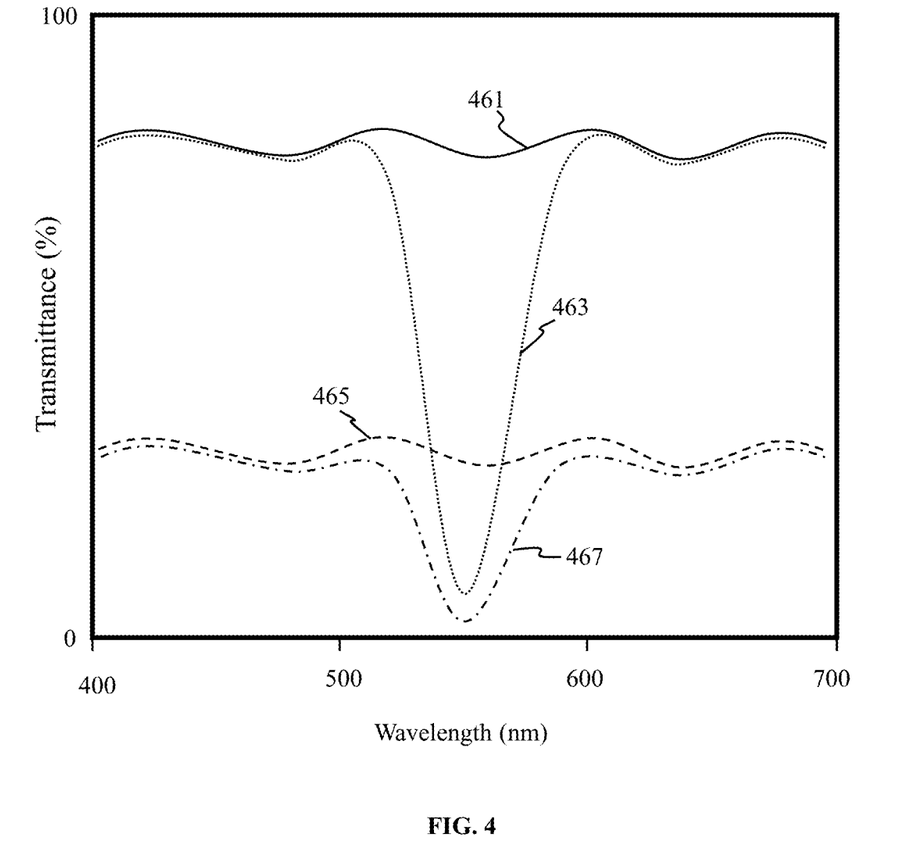
FIG. 4 is a graph of various light transmittance spectra according to some embodiments.

To further illustrate how wide band and narrow band cells may be used together, FIG. 4 shows a set of light transmittance spectra according to some embodiments. Transmittance spectrum 461 corresponds to the clear state of an MC-VTOD where both the first and second cells are in their state of higher transmittance. Transmittance spectrum 461 may optionally have neutrality (as illustrated here) as evidenced by the relatively low variability in ° 0T across the spectrum. Transmittance spectrum 463 corresponds to a first tinted state where one cell having a narrow band mixture, e.g., the first cell, is in a state of lower transmittance, and the other cell, e.g., the second cell, remains in a clear state. This first tinted state may, for example, be used to absorb green laser light. Transmittance spectrum 465 corresponds to a second tinted state produced by a wide band cell, e.g., the second cell, in its state of lower transmittance. The second tinted state here also corresponds to the MC-VTOD's colorimetrically neutral darkened state. That is, the wide band mixture has been formulated in this case to achieve a colorimetrically neutral darkened state without the need for the other cell. The second cell may be used to control general darkening of the MC-VTOD. Transmittance spectrum 467 corresponds to a third tinted state where both cells are in a state of lower transmittance. The third tinted state may be used to protect against laser light while also providing the user with reduced overall light transmittance. Although transmittance spectrum 467 has the lowest overall transmittance of the spectrums, it may not represent a colorimetrically neutral darkened state, since it does not have neutrality. If the overall average °/0T of spectrum 467 is high enough, the second tinted state may be perceived as having a magenta hue. If the overall average °/0T of spectrum 467 is low enough it May 5 be difficult to perceive a hue and may instead be characterized as having a low color chromaticity.

In some embodiments, an MC-VTOD may include or be interfaced with an additional variable transmission optical device. For example, the MC-VTOD may include an additional cell that is a wide band VTOD, or photochromic device, a hybrid 10 VTOD that may include PC dyes and/or PCDC dyes.

In some embodiments, one cell of the MC-VTOD may include a CLC host having right-handed chirality and the other cell of the MC-VTOD may include a CLC host having left-handed chirality. In some embodiments, the light absorbance curves of the two cells may have significant overlap. By changing the handedness of the CLC, the polarization dependence in the overlap region (although generally small in the present guest-host systems) may be further reduced which can result in a beneficial transmission swing increase. This effect may be strongest where the overlap is in the green region of the visible spectrum where the human eye has highest sensitivity, e.g., in first/second cell combinations of blue/yellow-orange and red/cyan.

The embodiments of FIGS. 3A-3D are representative of cells using a negative CLC host 322, 342 and a positive DC dye 324, 344. In some cases, one or both cells may instead employ a positive CLC host along with a positive DC dye. When using a positive CLC host with a positive DC dye, the state of lower light transmittance, which may be at or near its minimum light transmittance, occurs when there is no voltage applied. To move the cell to a state of higher light transmittance, a voltage is applied above a threshold voltage sufficient to significantly reorient the positive CLC host and DC dye. With sufficient voltage, the cell may have a light transmittance that is at or near its maximum. Thus, an MC-VTOD may be prepared using positive CLC hosts that is also capable of switching between a clear state, a first tinted state, optionally a second tinted state, and a colorimetrically neutral darkened state. In Table I below, some non-limiting options are summarized regarding how to achieve these various states for four different versions of an MC-VTOD device (VI-v4) as a function of CLC host (+ or −) and in which cells they reside in (first "1" or second "2"). Table I assumes positive DC dyes.

An entry of "Y" indicates that a voltage needs to be applied across the cell whereas "N" indicates that substantially no voltage is applied across the cell. MC-VTOD VI is basically the MC-VTOD described in FIGS. 3A-3D.

TABLE 1

| MC-VTOD state | Voltage applied as a function of cell/CLC host combination | | | |
|---|---|---|---|---|
| | MC-VTOD 1 (−) \| 2 (−) | MC-VTOD v2 1 (−) \| 2 (+) | MC-VTOD v3 1 (+) \| 2 (−) | MC-VT OD v4 1 (+) \| 2 (+) |
| Clear | N N | N Y | Y N | Y Y |
| First tinted | Y N | Y Y | N N | N Y |
| Second tinted | N Y | N N | Y Y | Y N |
| Neutral darkened | Y Y | Y N | N Y | N N |

In the event of a device failure (exhausted battery, damage to the electronics, or the like), a common fail-safe mode may be one where the MC-VTOD state is clear, such as with MC-VT OD VI. However, there can be other situations where the fail-safe mode may be the colorimetrically neutral darkened state, the first tinted state, or the second tinted state. For example, if a person (or device) using an MC-VTOD is in a situation where there is likely to be hostile or accidental lasers, it may be preferred that the fail-safe mode is in one of these non-clear states to ensure the MC-VTOD blocks harmful laser beams.

In some embodiments, the average clear state transmission of an MC-VTOD in a wavelength range of 400 nm-700 nm may be equal to or above 35° 0, 40% 45% 50° 0 55° 0 600 0 700 0 800 0 900 0 95%, 96%, 97%, 98% or 99%. In some embodiments, the average darkened state transmission of an MC-VTOD in a wavelength range of 400 nm-700 nm may be equal to or below 55%, 50%, 45%, 40%, 35%, 30% 25%, 20%, 15% 10° 0 or 1° 0.

The chirality of the host material results in an intrinsic pitch, p, of the liquid crystal host material. The ratio of the cell gap thickness, d, to this pitch is referred to as d/p. In some embodiments, the liquid crystal host may have d/p equal to 0. In some embodiments, the liquid crystal host may have a d/p greater than 0.

In some embodiments having low d/p and birefringence, referred to as "In the Mauguin limit", the polarization of the light follows that of the liquid crystal. Alternatively, devices that are not In the Mauguin limit, light propagation eigenmode are elliptical. In some cases, the host liquid crystal may make the device less polarization sensitive, i.e., less than 90%, 80%, 70%, 60%, 50%, 40%, 30%, 20% or 10% polarization sensitive.

In some embodiments, the cells 311, 331 of the MC-VTOD 310 may have a thickness to pitch ratio (d/p) of 0, alternatively greater than 0.01, alternatively greater than 0.1, 0.2, 0.3, 0.4, or 0.5. In some embodiments, d/p is less than 3.0, or alternatively less than 2 or 1. In some embodiments, d/p may be in a range of 0-0.2, 0.2-0.3, 0.3-0.4, 0.4-0.5, 0.5-0.6, 0.6-0.7, 0.7-0.8, 0.8-0.9, or any combination of ranges thereof.

In some embodiments, the MC-VTOD may use plastic substrates that have an optical retardation with less than +20% variation in uniformity across the area of the device, alternatively less than +15° 0, or less than +10° 0.

In some embodiments, the cells of the MC-VT OD may have a cell gap in a range of 3 to 5 microns, 5 to 7 microns, 7 to 10 microns, 10 to 15 microns, or 15 to 20 microns, or any combination of ranges thereof.

In some embodiments, the MC-VT OD or variable transmission optical system may have a transmission swing (the difference between the most transmissive "clear" state and the least transmissive "dark" state) that is greater than or equal to 3000 alternatively greater than 35° 0 40%, 45%, 50° 0 55° 0 60° 0 70°0 75%, or 80° 0.25 The dark state may correspond to the least transmissive colorimetrically neutral darkened state.

In some embodiments, a first tinted state may have a transmission in a first wavelength range (e.g., corresponding about to the absorption band of the DC dye(s) in the first electro-optic mixture) that is less than 30%, alternatively less than 20%, 15% 30 100 0, 5° 0, or 1%. When an MC-VTOD is intended to guard against laser light, in some cases, the transmission at the laser wavelength may be equal to or less than 15%, alternatively equal to or less than 10° 0 5% 100, or 0.5° 0. Some non-limiting examples of such laser wavelengths include one or more of 405 nm, 450 nm, 473 nm, 488 nm, 532 nm, 515 nm, 520 nm, 589 nm, 593 nm, 638 nm, 650 nm, and 670 nm.

In some embodiments, the guest-host mixture has a nematic-isotropic transition temperature TNI greater than 40° C. In other embodiments, the TNI is greater than 45° C., 50° C., 55° C., 60° C., 65° C., 70° C., 75° C., 80° C., 85° C. or 90° C.

In some embodiments, the one or more cells of the MC-VTOD includes a guesthost mixture with an order parameter, Smix, greater than or equal to 0.65, 0.7, 0.71, 0.72. 0.73, 0.74, 0.75, 0.76, 0.77 or 0.78, alternatively greater than or equal to 0.79 or 0.80.

Applications

The MC-VTOD has a wide variety of potential uses. For example, these devices may be directly fabricated into or laminated onto "wearable" products such as eyewear (such as prescription and non-prescription glasses and sunglasses), visors, goggles, face shields, near-eye displays, sensor optics, cameras, and AR/VR headsets to name a few.

Alternatively, they may be directly fabricated into or laminated onto other products including, but not limited to, windows (vehicles, buildings, aircrafts, etc.), windshields, sunroofs, heads-up displays, and optical instruments. Such products and devices may be further equipped with power supplies, batteries, sensors or the like. In some embodiments, the sensor(s) can provide information or data that is used in the operation 20 of the MC-VTOD. Some non-limiting examples of sensors include a light sensor, an imaging sensor and a laser warning receiver.

In some embodiments, one or both cells of the MC-VTOD may be divided into discrete, individually addressable regions to allow different regions of the MC-VTOD to display different states. In some cases, such regions may be formed by patterning the transparent conducting layer, optionally in combination with dividers to separate the electro-optic material into different sub-cells within the cell.

EXAMPLE EMBODIMENTS

An MC-VTOD may be fabricated according to protocols similar to that described here. Each cell can be fabricated using isotropic substrates of 3 mil polycarbonate coated with Indium Thin Oxide (ITO), a transparent conductor. On top of the ITO, a coating of polyimide, Nissan 5661 (Nissan Chemical Industries, Ltd., Tokyo, Japan), is spin coated.

This polyimide coating can serve as an alignment layer designed to induce a strong homeotropic alignment of the liquid crystal molecules. Next, L-34S black plastic spheres, 6.2 microns in diameter, (Hayakawa Rubber Co., Ltd, Hiroshima Japan) is sprayed onto one of the substrates to act as spacers. A thin bead of UV-curable adhesive, Loctite 3 106, (Henkel AG & Co. KGaA, Dusseldorf, Germany) is then applied around the perimeter of one of the substrates, leaving a gap that would serve as a fill port. The two substrates are assembled, pressed together against the spacers to create a uniform gap between the substrates, and then exposed to UV light to cure the adhesive.

For Cell 1, a guest-host mixture can be prepared that includes (1) 97.53% by weight of negative dielectric anisotropy liquid crystal host, MLC-6609, from Merck (EMI) Chemicals, Gibbstown, N.J.); which has a negative dielectric anisotropy (Ae<0)•. (2) 0.8% of chiral dopant, L-811, also from Merck (EMI) Chemicals, Gibbstown, N.J.), U.S.A; and (3) dichroic dye mixture consisting of 0.43% of DR-1112 (AlphaMicron Inc.) blue dye.

For Cell 2, a guest-host mixture can be prepared that includes: (1) 97.53% by weight of negative dielectric anisotropy liquid crystal host, MLC-6609, from Merck (EMI) Chemicals, Gibbstown, N.J.); which has a negative dielectric anisotropy (Ae<0)•(2) 0.8° 0 of chiral dopant, R-811, also from Merck (EMI) Chemicals, Gibbstown, N.J.), U.S.A; and (3) dichroic dye mixture consisting of 0.05° 0 of dye DR-1303 (AlphaMicron Inc. USA), 0.3% of DD 1060 (AlphaMicron Inc.), and 0.89% total of DD1123, DD1089 DD1032 (AlphaMicron Inc., USA) mixed in equal ratios.

The cells were laminated together using optically clear pressure sensitive adhesive. Each cell was individually connected to a driving circuitry that could be used to apply a square wave voltage with a peak value of 8V at 60 Hz.

Three replicate MC-VTODs (A1-A3) were prepared like those described above and tested for overall light transmittance (Table 2) and chromaticity (Table 3). In the tables, "blue" in the "On" column indicates that only the first cell was at or near its minimum light transmission state (MC- VTOD is in a first tinted state), "orange" in the "On" column indicates that only the second cell was at or near its minimum light transmission state (MC-VTOD is in a second tinted state), and "both" in the "On" column indicates that both cells were at or near their respective minimum light transmission states (MC-VTOD is in a darkened state). The Off columns represent when both cells are at or near their maximum light transmission state (MC-VTOD is in a clear state).

TABLE 2

| Sample | Transmittance Off | Transmittance On | Transmission swin |
|---|---|---|---|
| A1 Both | 60.92 | 13.21 | 47.71% |
| A1 Oran | | 37.1 | |
| A1 Blue | | 23.6 | |
| A2 Both | 60.48 | 13.14 | 47.34% |
| A2 Oran | | 36.81 | |
| A2 Blue | | 23.38 | |
| A3 Both | 60.82 | 13.72 | 47.1% |
| A3 Oran | | 37.19 | |
| A3 Blue | | 24.56 | |

TABLE 3

| Sample | Chromaticity (X, Y) | | | |
|---|---|---|---|---|
| | X Off | Y Off | X On | On |
| A1 Both | 0.311 | 0.325 | 0.28 | 0.291 |
| Oran e | | | 0405 | 0.357 |
| A1 Blue | | | 0.214 | 0.246 |
| A2 Both | 0.311 | 0.324 | 0.279 | 0.291 |
| Oran e | | | 0.405 | 0.359 |
| A2 Blue | | | 0.213 | 0.246 |
| A3 Both | 0.311 | 0.325 | 0.285 | 0.297 |
| Oran e | | | 0.405 | 0.358 |
| A3 Blue | | | 0.217 | 0.249 |

As can be seen from the data, the MC-VTOD devices are highly reproducible and meet many requirements that have been difficult to achieve in a single device. The MCVTODs each have a large transmission swing of about 47% (exceeding some specifications requiring at least 40%); high transmission in the clear state of about 61% (exceeding some specifications requiring at least 55%); and a controllable darkened state of about 13-14% (meeting some specifications requiring the darkened state to have 12-18% transmittance. Both the clear and darkened states have low color chromaticity, also meeting requirements for certain device specifications.

Figure 5A:
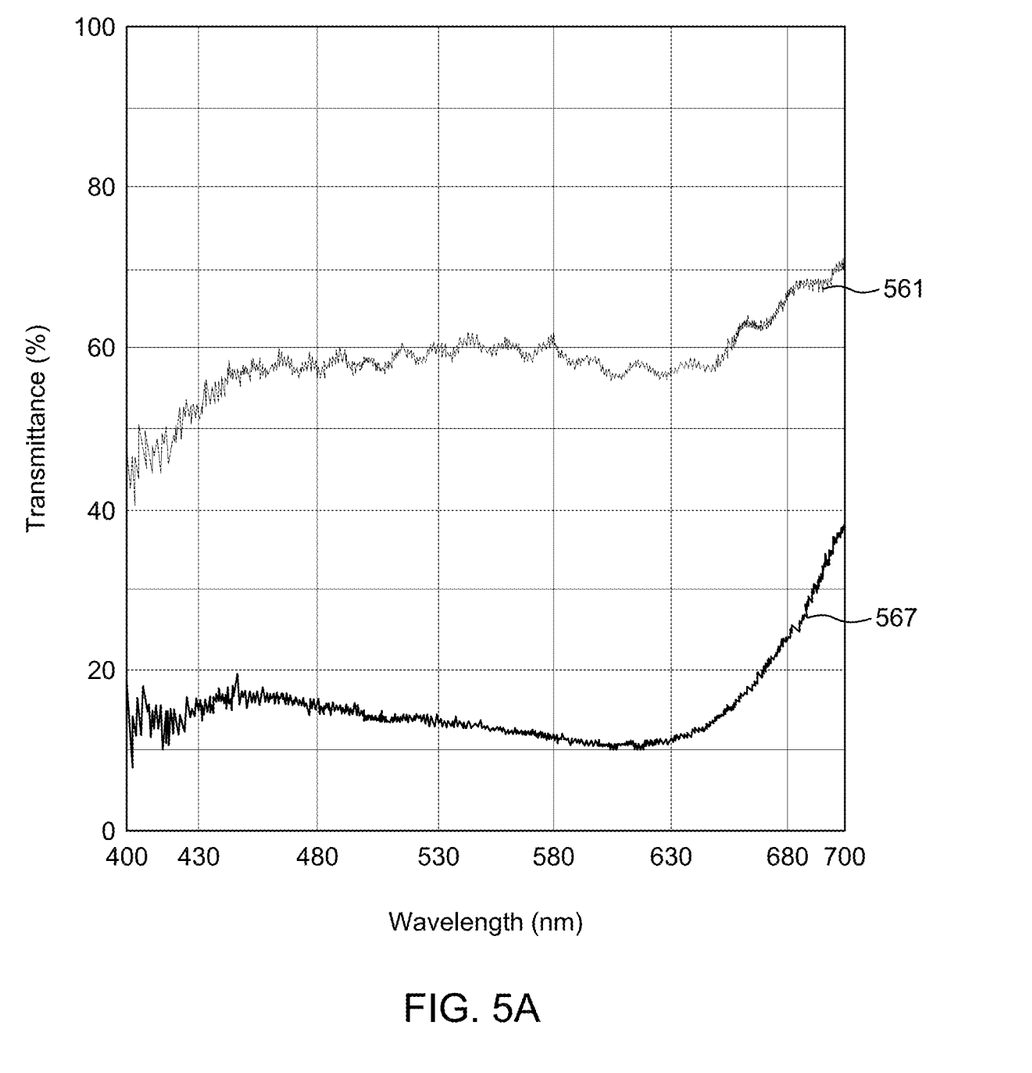
FIGS. 5A and 5B are graphs illustrating the spectral properties of an MC-VTOD device in four states.
Figure 5B:
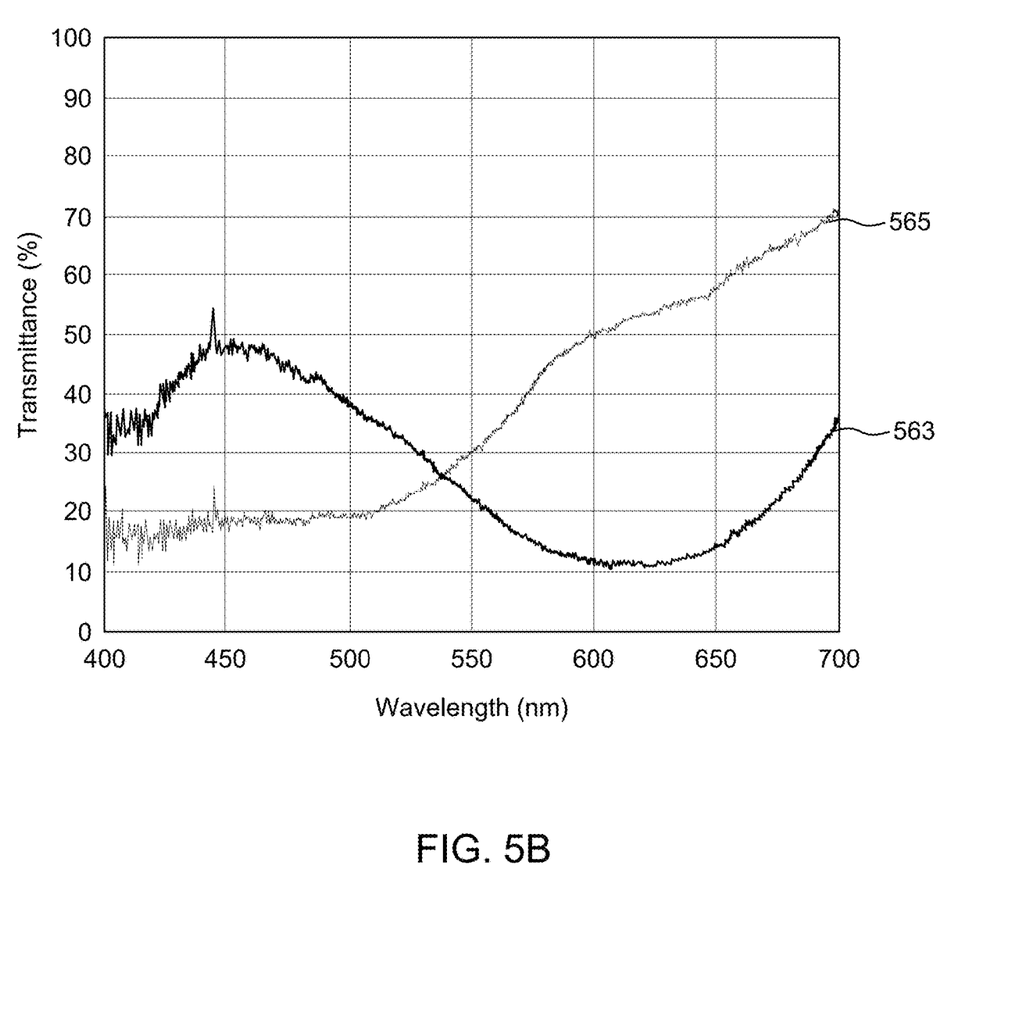

The spectral properties of an MC-VTOD similar to A1-A3 are shown in FIGS. 5A (clear state 561 and colorimetrically neutral darkened state 567) and 5B (first tinted state 563 and second tinted state 565). Although shown in units of % transmission, one can discern the FWHM absorption band for the blue cell in FIG. 5B, which in this embodiment, is less than 175 nm.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects. The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a" "an", and "the" include plural referents unless the context clearly dictates otherwise. Thus, for example, reference to "a method" includes a plurality of such methods and reference to "the layer" includes reference to one or more layers and equivalents thereof known to those skilled in the art, and so forth. The invention has now been described in detail for the purposes of clarity and understanding. However, it will be appreciated that certain changes and modifications may be practiced within the scope of the appended claims.

All publications, patents, and patent applications cited herein are hereby incorporated by reference in their entirety for all purposes. None is admitted to be prior art.

We claim:

1. A multi-color variable transmission optical device ("MC-VTOD") comprising:
    a first cell comprising a first electro-optic material having a first absorption profile provided between a first pair of substrates, wherein the first electro-optic material is capable of changing from a state of higher light transmittance to a state of lower light transmittance in a first wavelength region upon a change in a first electric field applied across the first electro-optical material;
    a second cell in optical communication with the first cell, the second cell comprising a second electro-optic material having a second absorption profile provided between a second pair of substrates, wherein the second electro-optic material is capable of changing from a state of higher light transmittance to a state of lower light transmittance in a second wavelength region different from the first wavelength region upon a change in a second electric field applied across the second electro-optical material; and a controller comprising a power supply for independently controlling the electric field applied to the first cell and the second cell, wherein:
a) the MC-VTOD is switchable between i) a clear state wherein the first cell and second cell are each in the state of higher light transmission, ii) a first tinted state wherein the first cell is in a state of lower light transmittance and the second cell is in a state of higher light transmittance, iii) a second tinted state wherein the first cell is in a state of higher light transmittance and the second cell is in a state of lower transmittance, and iv) a third tinted state wherein both the first and second cells are in a state of lower transmittance; and
b) at least one of the clear state or the first, second, or third tinted states is a colorimetrically neutral state.

2. The MC-VTOD of claim 1, wherein the first electro-optic material comprises a first CLC host and a first DC dye or dye mixture, and wherein the second electro-optic material comprises a second CLC host and a second DC dye or dye mixture, different from the first DC dye or dye mixture.

3. The MC-VTOD of claim 1, wherein the third tinted state is a colorimetrically neutral darkened state.

4. The MC-VTOD of claim 1, wherein when in the clear state, the transmitted light through the MC-VTOD is colorimetrically neutral.

5. The MC-VTOD of claim 1, wherein each of the first and second cells is characterized by a narrow band absorption of 175 nm or less in its respective state of lower light transmittance.

6. The MC-VTOD of claim 5, wherein neither the first cell nor the second cell is In the Mauguin limit.

7. The MC-VTOD of claim 1, wherein the first cell is characterized by a narrow band absorption of 175 nm or less and the second cell is characterized by a wide band absorption of greater than 175 nm.

8. The MC-VTOD of claim 1, wherein the first cell has a narrow band absorption of less than 100 nm.

9. The MC-VTOD of claim 1, wherein each of the first and second cells is characterized by a wide band absorption of greater than 175 nm.

10. The MC-VTOD of claim 1, wherein the first tinted state is colorimetrically neutral.

11. The MC-VTOD of claim 1, wherein the second tinted state is colorimetrically neutral.

12. The MC-VTOD of claim 1, further comprising a third cell in optical communication with the first and second cells, the third cell comprising a third electro-optic material provided between a second pair of substrates, wherein the third electro-optic material is capable of changing from a state of higher light transmittance to a state of lower light transmittance in a third wavelength region different from the first and second wavelength regions upon a change in an electric field applied across the third electro-optical material.

13. The MC-VTOD of claim 1, wherein the colorimetrically neutral tinted state has a CIE 1931 chromaticity coordinate x that is in a range of about 0.27 to about 0.36, and a chromaticity coordinate y that is in a range of about 0.29 to about 0.37.

14. The MC-VTOD of claim 1, wherein the colorimetrically neutral tinted state has an average percent deviation of spectral transmittance of less than about 20%.

15. The MC-VTOD of claim 1, wherein no polarizer is included.

16. The MC-VTOD of claim 1, wherein at least one of the first and second pairs of substrates are plastic substrates that have an optical retardation with less than +20% variation in uniformity across the area of the device.

17. An article of manufacture comprising the MC-VTOD of claim 1, wherein the article of manufacture includes eyewear, a visor, goggles, a face shield, an AR/VR headset, a near-eye display, a window, a windshield, a sunroof, a heads-up display or an optical instrument.

18. A multi-color variable transmission optical device ("MC-VTOD") comprising:
a first cell comprising a first electro-optic material having a first absorption profile provided between a first pair of substrates, wherein the first electro-optic material is capable of changing from a state of higher light transmittance to a state of lower light transmittance in a first wavelength region upon a change in a first electric field applied across the first electro-optical material;
a second cell in optical communication with the first cell, the second cell comprising a second electro-optic material having a second absorption profile provided between a second pair of substrates, wherein the second electro-optic material is capable of changing from a state of higher light transmittance to a state of lower light transmittance in a second wavelength region different from the first wavelength region upon a change in a second electric field applied across the second electro-optical material; and
a controller comprising a power supply for independently controlling the electric field applied to the first cell and the second cell, wherein:
a) the MC-VTOD is switchable between i) a clear state wherein the first cell and second cell are each in the state of higher light transmission, ii) a first tinted state wherein the first cell is in a state of lower light transmittance and the second cell is in a state of higher light transmittance, and iii) a colorimetrically neutral darkened state wherein at least the second cell is in a state of lower light transmittance; and
b) at least the first cell is characterized by a narrow band absorption of 175 nm or less in its state of lower light transmittance.

19. The MC-VTOD of claim 18, wherein the first electro-optic material comprises a first CLC host and a first DC dye or dye mixture, and wherein the second electro-optic material comprises a second CLC host and a second DC dye or dye mixture, different from the first DC dye or dye mixture.

20. The MC-VTOD of claim 18, wherein the second cell is characterized by a narrow band absorption of 175 nm or less in its state of lower absorbance, and wherein the colorimetrically neutral darkened state further includes the first cell in a state of lower light transmittance.

21. The MC-VTOD of claim 18, further comprising a second tinted state, wherein the first cell is in a state of higher light transmittance and the second cell is in a state of lower light transmittance.

22. The MC-VTOD of claim 18, wherein the first tinted state and the second tinted state comprise complementary colors.

23. The MC-VTOD of claim 18, further comprising a third cell in optical communication with the first and second cells, the third cell comprising a third electro-optic material provided between a second pair of substrates, wherein the third electro-optic material is capable of changing from a state of higher light transmittance to a state of lower light transmittance in a third wavelength region different from the first and second wavelength regions upon a change in an electric field applied across the third electro-optical material.

24. The MC-VTOD of claim 18, wherein the second cell is characterized by a wideband absorption of greater than 175 nm.

25. The MC-VTOD of claim 18, wherein the first cell has a narrow band absorption of less than 100 nm.

26. The MC-VTOD of claim 19, wherein one or both of the first and second CLC hosts have a negative dielectric anisotropy.

27. The MC-VTOD of claim 19, wherein one or both of the first and second CLC hosts have a positive dielectric anisotropy.

28. The MC-VTOD of claim 19, wherein one of the first and second CLC hosts is characterized by a right-handed chirality, and the other CLC host is characterized by a left-handed chirality.

29. The MC-VTOD of claim 18, wherein the clear state has an average visible light transmission that is greater than 40% higher than the colorimetrically neutral darkened state.

30. The MC-VTOD of claim 18, wherein the colorimetrically neutral darkened states has a CIE 1931 chromaticity coordinate x that is in a range of about 0.27 to about 0.36, and a chromaticity coordinate y that is in a range of about 0.29 to about 0.37.

31. The MC-VTOD of claim 18, wherein the colorimetrically neutral darkened state has an average percent deviation of spectral transmittance of less than about 20%.

32. The MC-VTOD of claim 18, wherein no polarizer is included.

33. The MC-VTOD of claim 18, wherein at least one of the first and second pairs of substrates are plastic substrates that have an optical retardation with less than +20% variation in uniformity across the area of the device.

34. The MC-VTOD of claim 18, wherein the first and second cells each have a d/p ratio of greater than 0.01.

35. The MC-VTOD of claim 18, wherein neither the first cell nor the second cell is In the Mauguin limit.

* * * * *